United States Patent [19]

Cunningham

[11] 4,228,723

[45] Oct. 21, 1980

[54] FASTENER RECESS

[76] Inventor: Hilary H. Cunningham, 9132 E. 37th Ct., Tulsa, Okla. 74145

[21] Appl. No.: 833,732

[22] Filed: Sep. 16, 1977

[51] Int. Cl.² .......................................... F16B 23/00
[52] U.S. Cl. .......................................... 81/460; 85/45
[58] Field of Search ............... 85/45, 61; 145/50 A, 145/50 R

[56] References Cited

U.S. PATENT DOCUMENTS

| 2,066,484 | 1/1937 | Phillips | 85/45 |
| 2,556,155 | 6/1951 | Stellin | 85/45 |

FOREIGN PATENT DOCUMENTS

| 1496092 | 8/1967 | France | 85/45 |

Primary Examiner—James T. McCall
Attorney, Agent, or Firm—James H. Chafin

[57] ABSTRACT

A recess for fasteners such as screws, bolts and the like having, in axial alignment with the shank, a central recess of a conic-frustum shape which serves as a natural center for a driver tool or for a drill bit if it becomes necessary to drill out the fastener. The wrenching elements consist of a plurality of truncated conic segments having their common center line axis coincident with the central recess. The wrenching walls for loosening lying in a plane containing the center line axis of the fastener while the walls for tightening being sloped toward the tightening direction to provide for torque limiting.

7 Claims, 11 Drawing Figures 4,228,723

FASTENER RECESS

BACKGROUND OF THE INVENTION

1. Field of the Invention

The present invention relates to fasteners and more particularly, but not by way of limitation, to a frusto-conical recess and associated driving tool having a torque limiting feature and a shaped recess to facilitate mating the driver with the recess.

2. Description of the Prior Art

The extensive use of screw-type fasteners in the production and maintenance of vehicles and particularly aircraft requires that the fastener design be as close to perfection as possible. Many thousands of manhours are wasted each year in aircraft maintenance alone in trying to remove "frozen" screws that have become stuck due to the duration of installation or most ususally from having been over torqued during installation.

Another problem inherent in the aircraft screw-type fastener is that upon application of excessive torque, the metal fastener is often damaged. The fastener recess is typically designed to insure that adequate installation torque may be applied with little thought given to the subsequent requirement of removing the installed fastener.

Another problem giving rise to damaged fastener recesses is that tolerances between the recess and the driver tool often result in uneven torque loads being applied to the wrenching elements of the recess. This problem causes "point loads" to be applied to the walls of the recess at its outer extremities resulting in failure of the recess normally called "camming out". When this problem occurs, the only remedy is to drill out the screw.

The greatest danger in drilling out a screw is that of improper alignment with the screw shank causing the drill to exit the screw recess hole damaging the installed component. The component must then be replaced or, if possible, be redrilled to accept an oversized screw which causes obvious subsequent problems.

SUMMARY OF THE INVENTION

The present invention provides a fastener recess design which, while being particularly directed toward meeting aircraft and automotive production and maintenance requirements, is suitable for use in practically any fastener application.

The fastener recess of the present invention, while being particularly shown for use in the common countersink-type screw or bolt, may be used for round head, pan head, fillister head or other type fasteners. The recess generally comprises a centrally disposed frusto-conical recess having a plurality of radially extending wrenching recess elements such that the load carrying faces of the wrenching elements generally form a plane containing the center line axis of the fastener.

It has been determined by extensive study that the typical installation mechanic upon installing a fastener will apply approximately 25 pounds of end-load force to the driver tool. Hence, in an effort to limit the amount of tightening torque applied to the fastener, the installation face of each wrenching element recess has been tilted off the vertical by an amount such that upon application of said 25 pound end-load, the driver will cam out of the recess when the proper torque value is reached.

Since removal of the fastener is usually the greatest problem, the removal face of each wrenching element is vertical and directly in line with the center line axis of the fastener thereby allowing maximum torque to be applied thereto. Further, it is noted that alignment of the wrenching surfaces with the center line axis of the fastener results in complete surface contact of the driver wrenching elements with the wrenching elements with the fastener which prevents "point loads" and reduces the hazard of stripping the recesses or "camming out".

The conic frustum shape of the central recess serves the dual purpose of smoothly guiding the driver into place and further serves as a natural center for a drill bit should it become necessary to drill out the fastener.

DESCRIPTION OF THE DRAWINGS

Other and further advantageous features will hereinafter more fully appear in connection with a detailed description of the drawings in which.

DESCRIPTION OF THE PREFERRED EMBODIMENT

Figure 1:
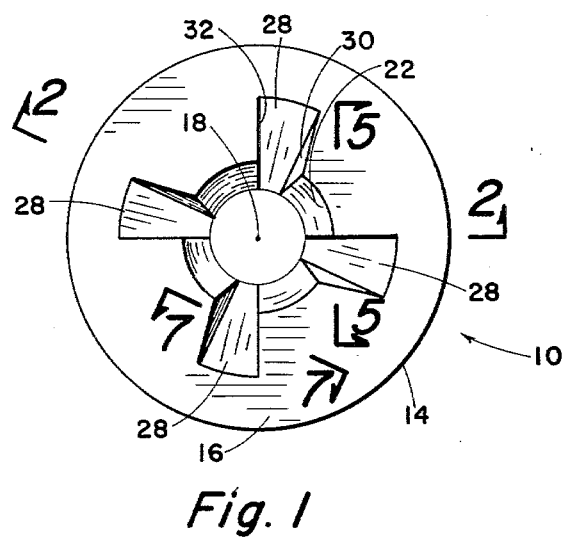
FIG. 1 is a plan view of a fastener having a recess embodying the invention.
Figure 2:
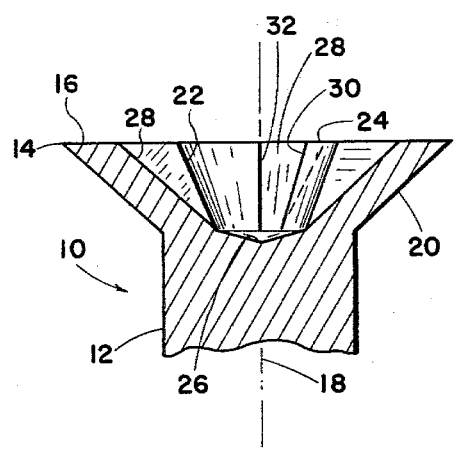
FIG. 2 is an elevational sectional view of the fastener of FIG. 1 taken along the broken lines 2—2 of FIG. 1.

Referring to the drawings in detail, reference 10 generally indicates a fastener having a shank portion 12, the lower end of which may be threaded with sheet metal or wood type screw threads, quick release components, or may be threaded to receive a nut (not shown). The upper or outer end of the shank 12 is provided with a countersink head member 14 having a flattened top surface 16. It is noted that a fastener embodying the invention may have substantially any head configuration without departing from the spirit and scope of the invention. For the purposes of description, reference character 18 generally indicates an imaginary line corresponding to the center line axis of the fastener. The head 14 also comprises a truncated conical shaped recess surface known as a countersink surface 20.

A frusto-conical recess 22 is provided in the head 14, the outer end or base thereof 24 being co-planar with the top surface 16 of the fastener, the outer diameter of which being normally less than the diameter of the shank 12. The inner end of the frusto-conical recess 22 is tapered inwardly to form an indent 26 which lies on the center line axis 18 for a purpose that will be hereinafter set forth.

A plurality of regularly spaced radially extending wrenching element recesses 28 are provided in the fastener head 14, four of which are shown in the drawings. It is pointed out that a fastener embodying the present invention may consist of two or more of such wrenching element recesses so long as they are regularly spaced about the outer periphery of the frusto-conical recess 22.

Each said wrenching recess extends from substantially the inside end of the frusto-conical shaped recess 22 and tapers outwardly, the outer end thereof terminating at the outer top surface 16 of the fastener head 14. Typically, the outer tapering wall of the wrenching element recess 28 is constructed substantially parallel to the lower conical surface 20 of the fastener head 14.

Figure 5:
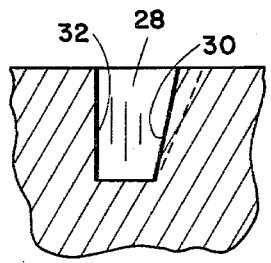
FIG. 5 is an elevational sectional view of the fastener of FIG. 1 taken along the broken line 5—5 of FIG. 1.
Figure 7:
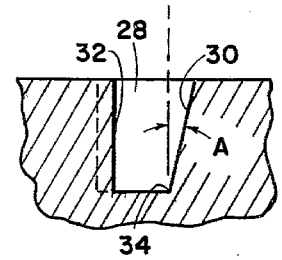
FIG. 7 is an elevational sectional view of a portion of the fastener of FIG. 1 taken along the broken lines 7—7 of FIG. 1.

The sidewalls or torque application walls for each wrenching element recess 28 comprise an installation face 30 and an oppositely disposed removal face 32. The removal face 32 of each wrenching element recess lies totally within a plane containing the center line axis 18 of the fastener as clearly shown in FIGS. 1 and 5. On the other hand, while the lower edge 34 of the installation face 30 is in alignment with the said center line axis 18, the face 30 itself is tilted in the direction away from the removal face 32 by an angle A as clearly shown in FIGS. 1 and 7.

Figure 3:
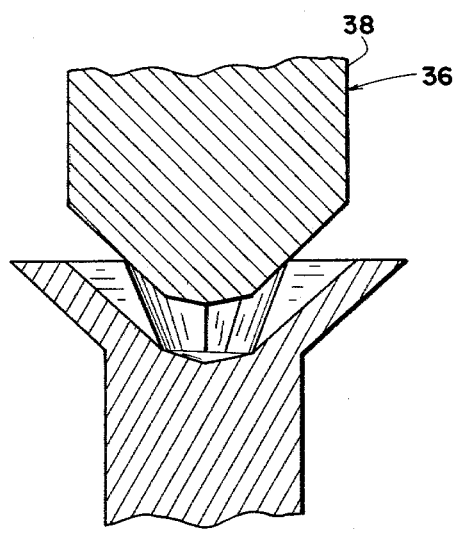
FIG. 3 is an elevational sectional view of the fastener of FIG. 2 including a sectional view of a compatible driver.
Figure 6:
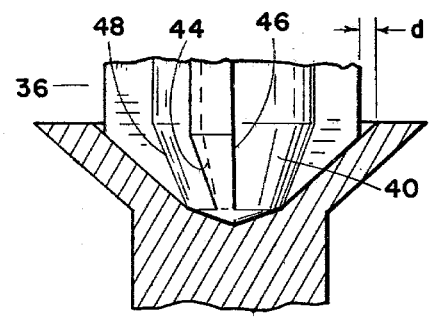
FIG. 6 is an elevational sectional view of the fastener and driver of FIG. 3, the driver being shown not in section.
Figure 8:
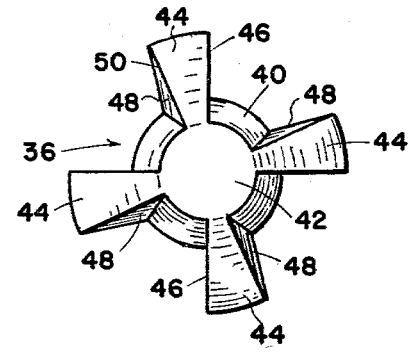
FIG. 8 is an end view of the driver tool of FIGS. 3 and 6.

Referring now to FIGS. 3, 6 and 8, reference character 36 generally indicates a driver tool for use with the fastener 10. The driver tool comprises a shank member 38, the outer end of which may be attached to an ordinary handle as with a typical screwdriver (not shown) or may be in the form of a suitable stud member for attachment to the chuck of a power fastener driver or the like (also not shown). The driving end of the driver tool generally comprises a frusto-conical-shaped element 40 which is of a size and shape conforming to the frusto-conical recess 22 of the fastener. The lower or inner end of the frusto-conical element 40, which will be referred to as the tip 42, tapers to a point at the center to conform to the dimple recess 26 of the fastener.

The driver end is provided with a plurality of spaced radially extending wrenching elements 44 which extend from the small end of the frusto-conical shaped element 40 outwardly and upwardly toward the driver shank 38 to conform to the wrenching element recesses 28 of the fastener. Each driver wrenching element 44 is provided with a removal face 46 which lies in a plane containing the center line axis of the driver tool, which upon insertion of the driver tool into the recess of the fastener will cause each removal face 46 to be in complete contact with each removal face 32 of the fastener.

Each wrenching element 44 of the driver is also provided with an oppositely disposed tightening face 48 having a lower or inner edge 50 which is in alignment with the center line axis of the driver and is engageable with the lower edge 34 of the wrenching element recess of the fastener when the driver is installed or inserted into the fastener recess. The tightening face or installation face 48 tapers outwardly by an angle A such that when the driver tool is inserted in the fastener recess, the entire installation face 48 is in engagement with the installation face 30 of the fastener recess.

Referring to FIG. 6, it is noted that the width of the wrenching elements of the driving tool may be slightly smaller than that of the fastener recess by some increment d as a matter of design but not necessarily so.

In operation, when it is desirable to tighten a fastener 10, the driving tool 36 is inserted into the recess of the fastener 10 noting that the frusto-conical shape of the driving tool in conjunction with frusto-conical recess of the fastener will aid in aligning the driving tool with the fastener and once the wrenching elements thereof are in alignment with the wrenching element recesses of the fastener, the driver will slip snuggly into place.

Hence, to tighten the fastener, rotational force is applied to the driver in order to rotate the fastener in a clockwise direction as shown in FIG. 1 whereby the installation face 48 of each wrenching element is in direct contact with the installation face 30 of the fastener. It is seen that with a substantially constant end load applied to the driver toward the fastener, only a certain amount of torque can be applied to the fastener before the installation faces 48 and 30 begin to slip which will cause the driver to cam out of the recess. The amount of torque that may be applied is directly proportional to the angle A of the inclined installation faces 30 and 48. If it is desired to be able to apply greater torque to the fastener, the angle A will be constructed small. By the same token, if it is desired to apply less torque in tightening the fastener, the angle A will be constructed greater.

On the other hand, when it is desired to loosen the fastener or rotate the fastener in a counterclockwise direction as shown in FIG. 1, a reverse rotational force is applied to the driver, the force being transmitted from the removal face 46 of the driver to the removal face 32 of the fastener. It is seen that since the removal faces 46 and 32 lie in a plane containing the center line axis 18 of the fastener, total surface contact will be maintained between said removal faces 32 and 46 regardless of the amount of torque applied thereto. Therefore, the limiting amount of torque in loosening or removing the fastener will simply depend on the strength of the material of the fastener and the driver.

Figure 4:
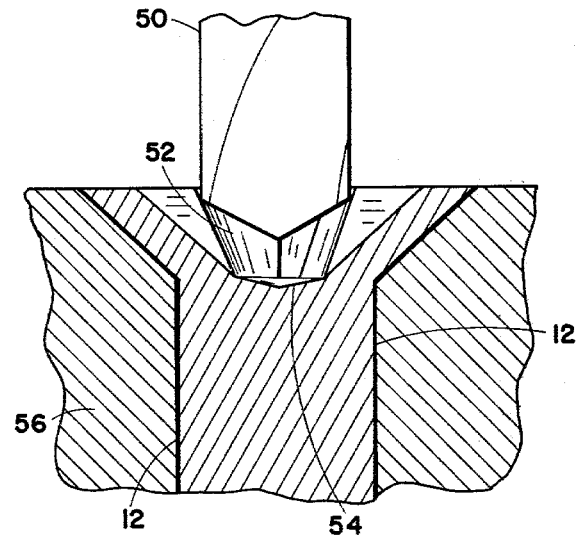
FIG. 4 is an elevational sectional view of the fastener depicting a compatible drill-out bit.

If it is discovered that the fastener cannot be removed or that the wrenching element recesses thereof become stripped or damaged, the fastener then may be readily drilled out by a suitable drill bit 50 as shown in FIG. 4. One of the design criteria features of the frusto-conical recess 22 is that it conforms with the tapered truncated conical end portion 52 of a suitable size drill bit. Further, the typical drill bit 50 is provided with a tapered end portion 54 which will naturally be guided toward the center of the recess. Therefore, in order to drill out the fastener, the drill bit shape will conform to and tend to be centered by the central portion of the recess of the fastener thereby guiding the drill bit into alignment with the fastener shank 12 to assure that the drilling operation stays totally within the fastener and does not damage the component being held by the fastener, the component being shown in FIG. 4 by reference character 56.

It is pointed out that although the installation and removal faces of the fastener are shown corresponding to a fastener having right hand threads, the installation and removal face elements would simply be reversed for fasteners having left-handed threads.

Figure 9:
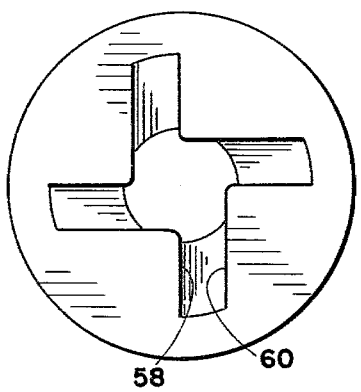
FIG. 9 is a plan view of a prior art fastener.
Figure 10:
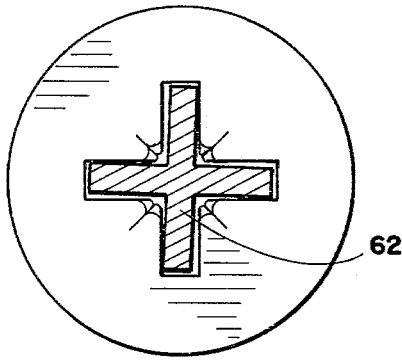
FIG. 10 is a plan view of a second prior art fastener.
Figure 11:
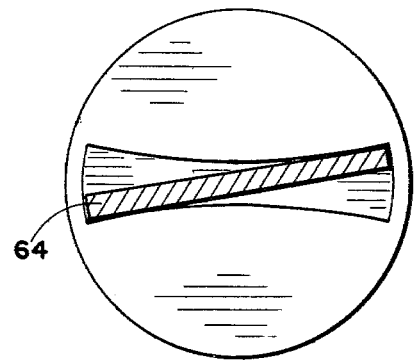
FIG. 11 is a plan view of a third prior art fastener.

FIGS. 9, 10 and 11 depict fastener recesses which are typically being used in the aerospace industry and in the automotive industry as a representative of the prior art.

The fastener depicted in FIG. 9 is known as the Torque Set Fastener and it is primarily designed so that the installation faces 58 of the wrenching element of the recesses are in alignment with the center line axis of the fastener and hence would allow good face-to-face contact upon tightening the recess. However, since the removal faces 60 are not in alignment with the center line axis of the fastener, any slop or tolerance between the driver tool and the recess would cause point loading near the outer end of its recess which often results in damaging the fastener recess upon removal. Further, the fastener of FIG. 9 is not provided with a frusto-conical central portion to aid in aligning a drill bit in the cases where a fastener must be drilled out.

The fastener recess depicted in FIG. 10 which is commonly known as the Pozidrive has neither the installation faces nor the removal faces in alignment with the center line axis of the fastener and therefore any tolerance between the driver tool indicated by reference character 62 and the recess would cause point loading as depicted in FIG. 10 on either installation or removal.

An attempt to solve the point loading problem was made in the development of a fastener recess shown in FIG. 11 known as the Hi-Torque recess in which the installation and removal faces were curved outwardly so that the outer end portions thereof are in substantial alignment with the center line axis of the fasteners. However, it is seen that the primary loads between the driver indicated by reference character 64 and the recess takes place near the outer end of the recess which is the most shallow portion thereof and again will often cause stripping to occur either when the fastener is being tightened or loosened.

From the foregoing, it is apparent that the present invention provides a fastener recess and associated driving tool such that greater back out or removal torque can be applied than installation torque to provide a high probability of fastener removal.

It is also apparent that the present invention provides a frusto-conical recess guide which serves as a natural center for guiding the driver tool into place and further serves as a natural center and alignment means for guiding a drill bit into place when it becomes necessary to drill out the fastener, which in effect minimizes the effort on the part of the operator and reduces fastener installation and removal time. Further, as pointed out, while a four wrenching element recess is shown in the drawings, the design concepts can apply to any multiple element recess so long as the removal faces and installation faces are in substantial alignment with the center line axis of the fastener.

Whereas, the present invention has been described in particular relation to the drawings attached hereto, other and further modifications apart from those shown or suggested herein may be made within the spirit and scope of the invention.

What is claimed:

1. A rotational fastener having a recess and associated driver tool comprising;
   (a) centrally disposed frusto-conical recess carrier by the fastener surrounding the rotational axis thereof, a plurality of equally spaced wrenching element recesses extending radially outwardly from the frusto-conical recess, each wrenching element recess comprising a first force application face lying in a plane containing the fastener rotational axis and an oppositely disposed second force application face, means carried by the second face to limit the force that can be applied thereto; and
   (b) the driver tool comprising a shank, driver head at one end of the shank, said driver head having a convex shape to conform to the fastener recess.

2. A rotational fastener having a recess comprising:
   (a) a centrally disposed recess surrounding a rotational axis of the fastener; and
   (b) a plurality of equally spaced wrenching element recesses extending radially outwardly from the recess, each said wrenching element recess comprising a removal face lying in a plane containing the rotational axis of the fastener and an oppositely disposed installation face substantially radially extending and lying in a plane which intersects said fastener rotational axis, the outer portion of said installation face being tilted in a direction away from the removal face.

3. A rotational fastener having a recess in a head portion thereof comprising:
   (a) a centrally disposed recess surrounding a rotational axis of the fastener, said recess having frusto-conical walls extending from an outer face of the fastener head and terminating at a base of the recess with a centrally disposed indent; and
   (b) a plurality of equally spaced wrenching element recesses extending radially outwardly from the frusto-conical walls of the recess, each said wrenching element recess extending from the base of said frusto-conical wall outwardly to the outer face of the fastener head, each said wrenching element recess comprising a removal face lying in a plane containing a rotational axis of the fastener and an oppositely disposed installation face substantially radially extending and lying in a plane which intersects said fastener rotational axis, the outer portion of said installation face being tilted in a direction away from the removal face.

4. A fastener recess as set forth in claim 3 wherein the fastener includes an elongated cylindrical shank member and a head at the outer end thereof, the recess being carried by the head and wherein the outer end of the frusto conical recess has a diameter of less than that of the shank.

5. A fastener recess as set forth in claim 3 wherein the inner end of the frusto-conical recess is tapered inwardly toward the rotational axis to form said indent at the inside center of the recess, said indent being substantially conical in shape.

6. The rotational fastener as set forth in claim 3 wherein each wrenching element recess has an elongated floor surface between the installation and removal faces, the inner end of the floor surface extending from the inner end of the frusto conical recess to the plane of the outer end of the frusto conical recess.

7. A fastener recess as set forth in claim 3 wherein the number of wrenching element recesses is four.

* * * * *